UNITED STATES PATENT OFFICE.

ELWYN M. WATT, OF SUMMERTON, SOUTH CAROLINA.

COMPOSITION.

1,387,569.  Specification of Letters Patent.  Patented Aug. 16, 1921.

No Drawing.  Application filed February 26, 1919. Serial No. 279,468.

*To all whom it may concern:*

Be it known that I, ELWYN MORGAN WATT, a citizen of the United States, residing at Summerton, county of Clarendon, State of South Carolina, have invented a new and useful Composition, of which the following is a specification.

The object of the invention is the provision of a composition which will be effective as a remedy in the treatment of diseases affecting animals, and also as an insecticide.

The improved composition consists of a mixture of the following ingredients mixed in the proportions stated, namely:

Sulfur _____ 4 drams
Spirits of camphor _____ 2 drams
Spirits of turpentine ____ ½ dram
Linseed oil _____ 1 pint The composition described has been found by practical use to be a very effective remedy for treating animal mange, particularly for the treatment of hogs and dogs, for chicken sorehead and also as a means for killing bed bugs, plant bugs and all insects which infect animals. The composition is applied to the animal by means of a brush, cloth or may be poured directly on to the infected surface.

Having thus described the invention what is claimed and desired to be secured by Letters Patent is:

1. The herein described mange cure and insecticide composed of linseed oil, sulfur, spirits of camphor and spirits of turpentine in approximately the following proportions: 1 pint of oil, 4 drams of sulfur, 2 drams of camphor, ½ dram of turpentine.

2. A composition for the purposes described consisting of linseed oil, sulfur, spirits of camphor and spirits of turpentine, the oil constituting more than 50% of the mixture.

Signed at Summerton, in the county of Clarendon, and State of South Carolina, this 24th day of May, A. D. 1919.

E. M. WATT. [L. S.]

In the presence of—
W. H. ANDERSON,
W. D. MCCLARY.